Dec. 20, 1966   E. G. NILSSON   3,292,232
METHOD AND APPARATUS FOR ASSEMBLING VENETIAN BLINDS
Filed Sept. 21, 1964   6 Sheets-Sheet 3

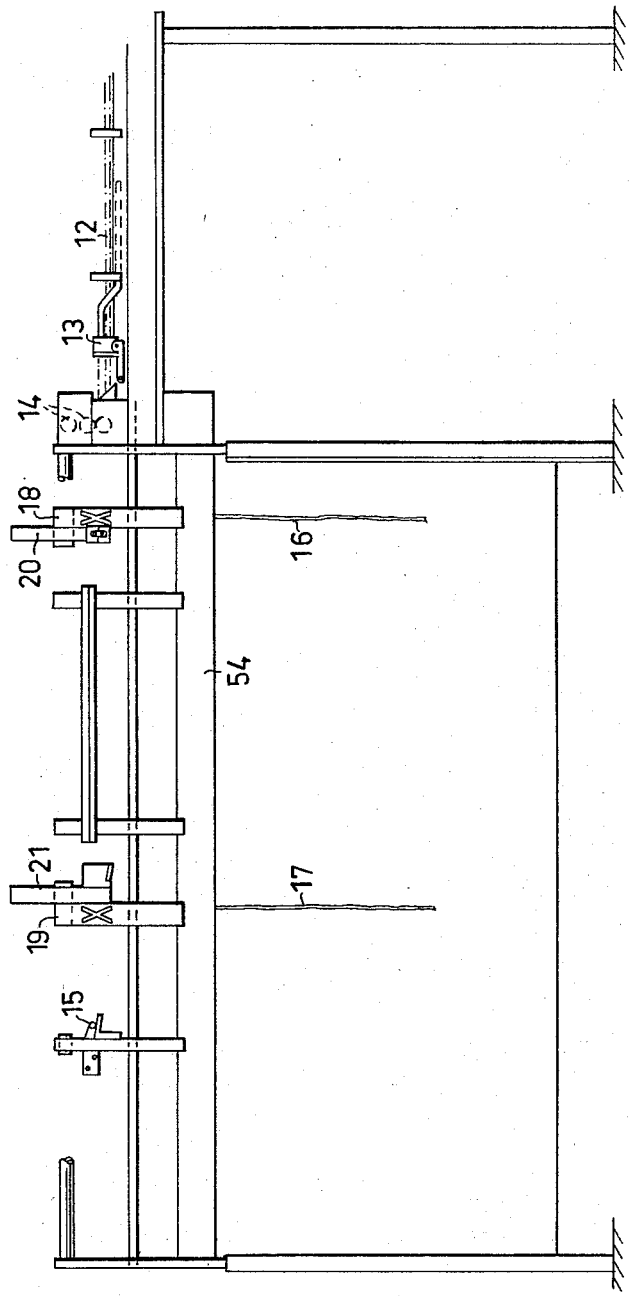

Dec. 20, 1966     E. G. NILSSON     3,292,232
METHOD AND APPARATUS FOR ASSEMBLING VENETIAN BLINDS
Filed Sept. 21, 1964                    6 Sheets-Sheet 5

Dec. 20, 1966     E. G. NILSSON     3,292,232
METHOD AND APPARATUS FOR ASSEMBLING VENETIAN BLINDS
Filed Sept. 21, 1964     6 Sheets-Sheet 6
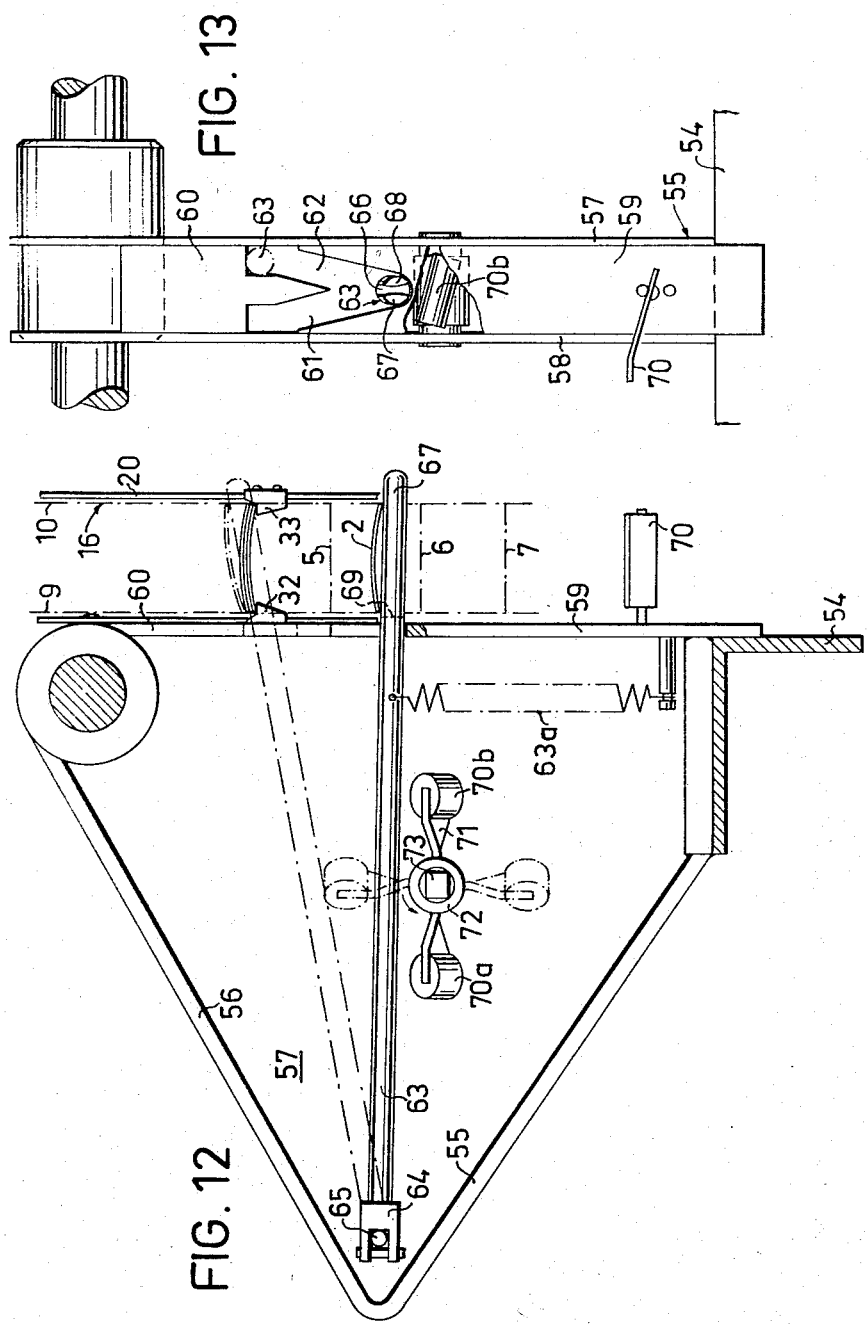

United States Patent Office 3,292,232
Patented Dec. 20, 1966

3,292,232
METHOD AND APPARATUS FOR ASSEMBLING
VENETIAN BLINDS
Erik Gunnar Nilsson, Almgatan 12E, Mjolby, Sweden
Filed Sept. 21, 1964, Ser. No. 397,705
Claims priority, application Sweden, Sept. 24, 1963,
10,424/63; Feb. 26, 1964, 2,341/64
9 Claims. (Cl. 29—24.5)

This invention relates to methods and apparatus for assembling Venetian blinds, and relates particularly to the assembling of the slats in cord ladders disposed near lifting cord openings in the slats and including cross-cords for supporting the slats.

The object of the invention is to provide an apparatus which facilitates the threading of the lifting cords through the lifting cord openings in such a manner that the lifting cords will be weaved into the cross-cords of the cord ladders supporting the slats.

Another object of the invention is to provide automatically assembling means of a construction such that the cord ladders will assume such positions relative to the lifting cord openings of the slats in a stack of assembled slats so as to have the cross-cords disposed alternately on opposite sides of the lifting cord openings which will enable an easy weaving of the lifting cords into the cross-cords simply by threading the lifting cords right through the lifting cord openings.

These and other objects of the invention will be disclosed more in detail in the following description of some suitable embodiments of the invention shown by way of example in the accompanying drawings.

Figure 1:
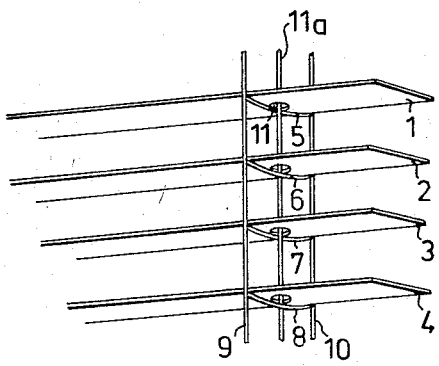
Figure 2:
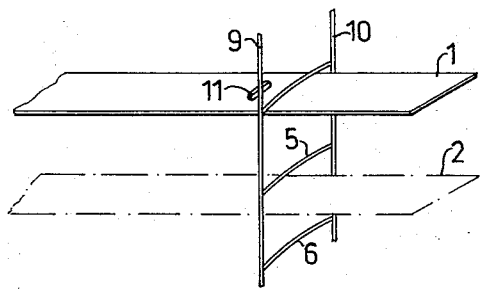
Figure 3:
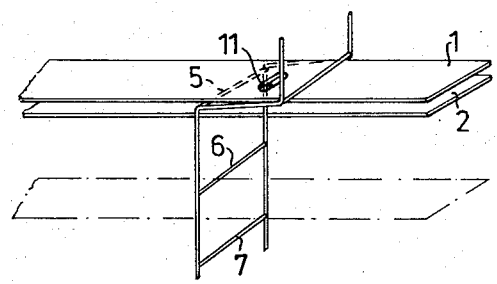
Figure 4:
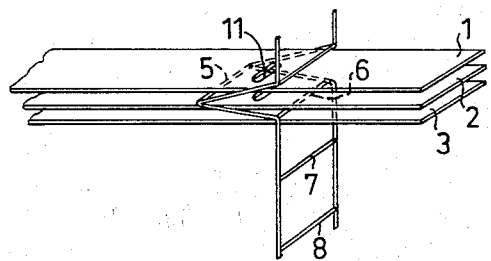
Figure 7:
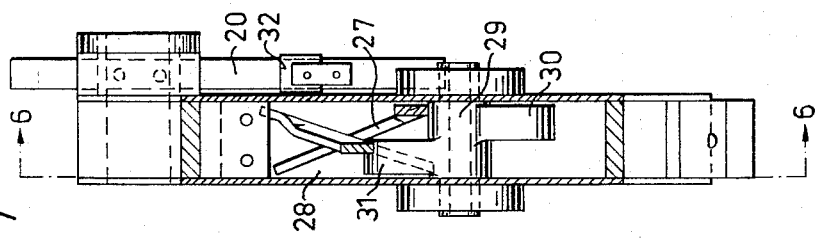
Figure 6:
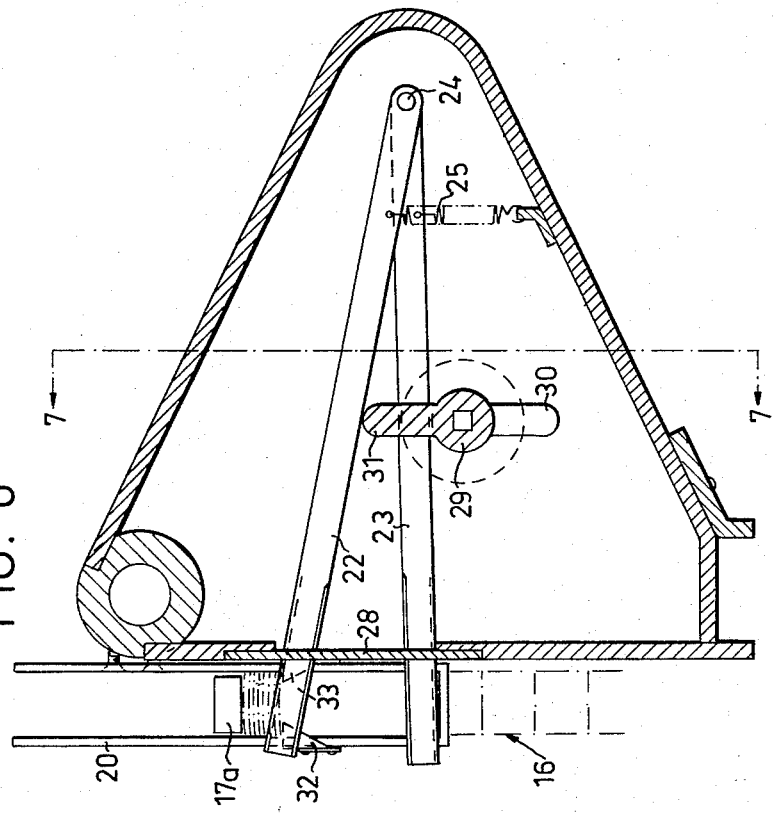
Figure 8:
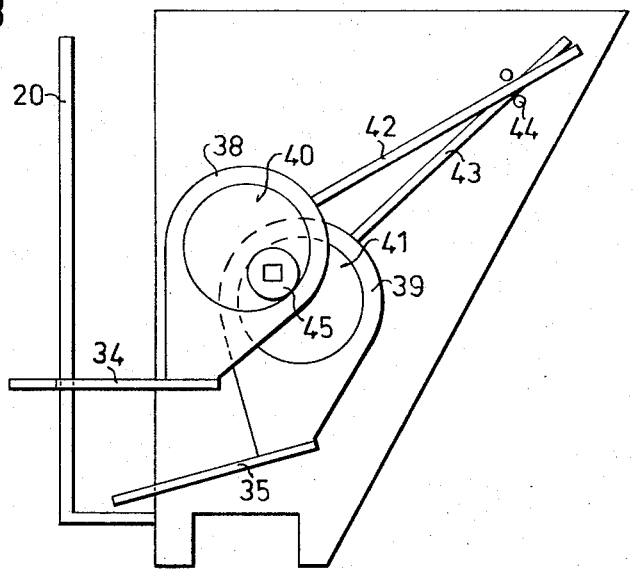
Figure 9:
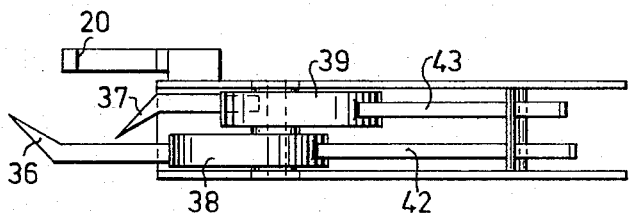
Figure 10:
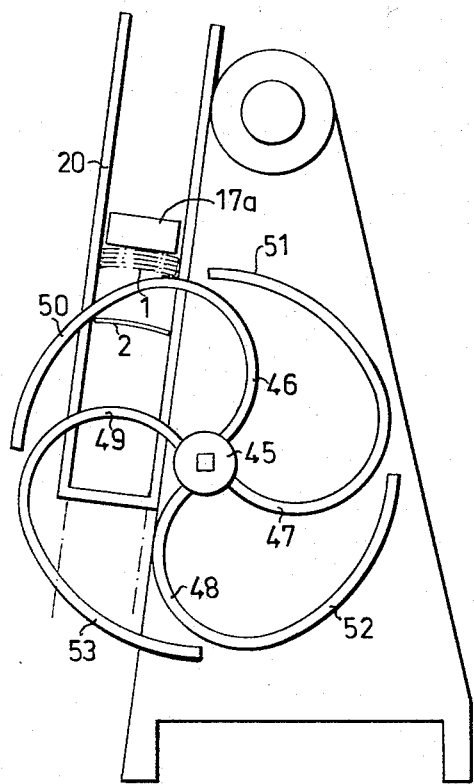
Figure 11:
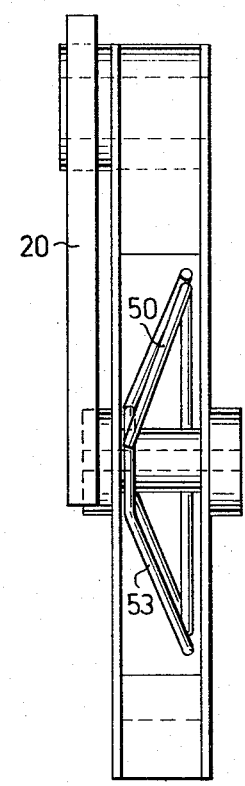

FIG. 1 is a diagrammatic perspective view of one end of a portion of an assembled Venetian blind illustrating a cord ladder and a number of slats supported by the cross-cords of the ladder. FIG. 2 shows a first slat inserted into a slat opening of a ladder and lifted to the upper end of the slat opening, a second underlying slat being shown by chain-dotted lines in a starting position in the slat opening prior to the lifting the same when the cord ladder is located at one side of the lifting cord openings in the slats. FIG. 3 shows the position in which the second slat in FIG. 2 has been lifted towards the first slat while the ladder simultaneously has been displaced to the other side of the lifting cord openings, a third slat being shown by chain-dotted lines in its starting or free position. FIG. 4 illustrates the position in which the third slat has been lifted towards the second slat and the ladder has simultaneously been laterally displaced back to the position shown in FIG. 2. FIG. 5 is a diagrammatic elevational view of the machine according to the invention provided with two lifting devices of the kind shown in FIGS. 6 and 7. FIG. 6 is a cross-section through one of the lifting devices taken on the line 6—6 in FIG. 7. FIG. 7 is a sectional view on the line 7—7 in FIG. 6. FIG. 8 is a side view of another embodiment of the lifting device. FIG. 9 is a top view of the device shown in FIG. 8. FIG. 10 is a diagrammatic side view of a third embodiment of the lifting device, and FIG. 11 is a front elevation of the device shown in FIG. 10. FIG. 12 is a cross-sectional view corresponding to FIG. 6 and illustrates a preferred embodiment of a lifting device for assembling the slats in accordance with the principles of the invention, and FIG. 13 is a front view of the device shown in FIG. 1.

With reference to FIG. 1 numerals 1, 2, 3, 4 denote four Ventian blind slats which in FIG. 1 rest on cross-cords 5, 6, 7 and 8, respectively, of cord ladders. Each ladder has two side cords 9, 10. The slats have lifting cord openings 11 for a lifting cord 11a as shown in FIG. 1. The lifting cord 11a of the assembled Venetian blind is woven into the cross-cords such that the cross-cords are disposed alternately on opposite sides of the lifting cord 11a in order to hold the ladder in position relative to the slats in a manner known per se.

The machine illustrated in FIGS. 5, 6 and 7 is provided at one end with a magazine 12 for slats to be assembled. The slats are gripped by a feeder 13 one by one and moved with their forward ends into the gap between feed rollers 14 which move each slat into a starting position in which the forward end of the slat actuates a limit switch 15 which stops the driving means for the feed rollers 4. In this position the slat has been moved through aligned slat openings of two cord ladders 16, 17 depending from the head 17a of the Venetian blind, FIG. 6. At each ladder is a lifting device 18 and 19, respectively. Provided near each lifting device is a U-shaped holder 20 and 21, respectively. These holders support the head 17a and permit the same to be raised as slats are inserted into the cord ladders 16, 17 and are lifted toward superposed slats to form a stack. Evidently the slats are stacked from below.

Since two lifting devices 18, 19 are identical, only one of them will be described with reference to FIGS. 6 and 7 which illustrate two lifting arms 22, 23 pivotally mounted on a shaft 24 fixed in the frame of the apparatus. The lifting arms are biased to their lower or starting positions by tension springs 25. The lifting arms extend through elongated slots 26, 27 in a plate 28 fixed to the frame. The slots extend obliquely upwards and cross each other, as shown in FIG. 7. The arms 22, 23 are raised by means of a rotatable hub 29 provided with two diametrically opposite cams 30, 31 the cam 31 keeping the arm 22 in raised position as viewed in FIG. 6. When a slat, such as the slat 2 in FIG. 2, is to be inserted into the cord ladders 16, 17 both cams 30, 31 are in their horizontal positions. When the slat has been inserted to its starting position in the ladders the hub is rotated a quarter of a revolution resulting in that, e.g., the cam 31 is raised and raises the arm 22 so that its end is moved obliquely upwardly and lifts the slat 2 from the starting position shown in FIG. 2 to the raised position shown in FIG. 3. At the same time the ladder is displaced to the left of the lifting cord openings 11 as shown in FIG. 3. The cross-cord 5 between slats 1 and 2 is clamped between these slats which are snapped upwards between retaining means in the form of spring-loaded noses 32, 33 (FIG. 6). Accordingly as succeeding slats are lifted and snapped beyond the noses 32, 33 to be supported thereby the stack of assembled slats resting on the noses and located in the holders 20, 21 is increased in height.

After still further slat 3 has been inserted into the ladders this slat will be lifted to the position shown in FIG. 4 by means of the arm 23 which at the same time displaces the adjacent lifting ladder laterally to the right of the aligned lifting cord openings 11, FIG. 4. The cross-cord 6 will be clamped between the slats 2 and 3. In this way the assembling operation is continued with the cross-cords clamped between the slats and located alternately on opposite sides of the lifting cord openings 11. When all slats have been assembled it is an easy thing to thread the lifting cords through the openings 11 and thereby to weave the lifting cords into the cross-cords.

In FIGS. 8 and 9 are illustrated two lifting arms 34, 35 having obliquely directed end portions 36 and 37, respectively. The lifting arms are secured to rings 38, 39 mounted on excentrics 40, 41. Secured to the rings are balancing arms 42, 43 which are displaceably and pivotally mounted at 44 in the frame of the apparatus. Upon rotation of the common shaft 45 of the excentrics the arms 34, 35 are alternately swung forward and upward and the oblique end portions 36, 37 move the lifting ladder alternately to opposite sides of the lifting cord openings as the slat is lifted.

In FIGS. 10 and 11 is shown an embodiment in the form of a spoked wheel having a hub 45 to which four spokes 46, 47, 48, 49 are connected. The end portions 50, 51, 52, 53 of the spokes are arcuate and located on a circle. The portions 50, 51, 52, 53 extend alternately obliquely in opposite directions as will be seen from FIG. 11. If a slat 2 is inserted into the lifting ladders to a starting position between the spokes 49, 46 as indicated in FIG. 10 and the wheel is rotated the slat will be lifted to the position corresponding to the uppermost position of the portion 53 of the spoke 49. Upon continued rotation of the hub 45 the slat 2 will be supported by the portion 53 until the portion 52 of the succeeding spoke 48 takes over to support and lift the slat 2 as well as the superposed stack of slats. At the same time the obliquely directed end portions 50, 51, 52 and 53 will displace the ladder laterally alternately in opposite directions in the manner previously described. In this embodiment no special retaining members such as the noses 32, 33 of FIG. 6 are required for the lifted slats which as described above will ride on the spokes.

A preferred modification of the lifting devices 18, 19 of the apparatus shown in FIG. 5 is illustrated in FIGS. 12 and 13. The lifting devices in all embodiments shown are displaceable along a beam 54 forming part of the frame of the apparatus so that the lifting devices may be adjusted to the distance between the lifting cord openings in the slats. The lifting device shown in FIGS. 12 and 13 is located in a casing 55 which is displaceable along the beam 54 to be locked in position in front of the ladders 16, 17 depending from the Venetian blind head disposed in the holders 20, 21. The cord ladder 16 including the members 6, 7, 9, 10 is indicated by dotted lines in FIG. 12 but is omitted in FIG. 13 for the sake of clearness. In this figure also the holder 20 or 21, respectively, as shown in FIG. 5, is omitted.

The casing 55 consists of a frame 56 which on one side has a fixed cover plate 57 and on the other side a detachable cover plate 58 which is omitted in FIG. 12.

The front of the casing 55 is formed by a lower front plate 59 and an upper front plate 60. The adjacent ends of these plates form a V-shaped guide 61, 62.

A raising arm 63 is at its rear end provided with a fork 64 journalled on a fixed pin 65 such as to be able to be swung upwards as well as laterally. The arm 63 is shown by full lines in its lower end or starting position to which it is biased by a helical spring 63a. The arm 63 extends with its forward end outside the V-shaped guide 61, 62 and rests in its lower position on the bottom of the guide as shown in FIGS. 1 and 2. The free end portion of the arm extending outside the front plates 59, 60 is bifurcated and the slit shaped gap 66 between its prongs 67, 68 extends to a bottom 69, as indicated in FIG. 1.

The width of the gap 66 is great enough to permit the ladder 16 to pass freely between the prongs 67 and 68. The ladder 16 is kept taut by a resilient plate 70 which will engage a cross-cord of the ladder and disengage when the ladder is lifted upon raising a slat from its starting position, and engage the succeeding cross-cord.

The arm 63 is raised by means of two cams 70a, 70b which are secured to the ends of a plate 71 having a hub 72 mounted on a rotary shaft 73. The shaft 73 is driven synchronously with the feeding means which advances the slats 1 one by one to the starting position in which they are to be raised by the arms 63 provided at the respective ladders.

If the cam 70b raises the arm 63, the arm will be urged along in the right-hand leg 62 of the V-guide to the position indicated by chain-dotted lines in FIG. 13. After half a revolution of the shaft 73 the cam 70a is in position for raising the arm 63 from its lower end position. Since the cam 70a in this raising position is oppositely inclined as compared with the cam 70b, the arm 63 will be urged upwardly along the left-hand leg 61 of the guide in FIG. 2.

When the slat 2 is lifted by raising the arm 63 from the lower to the upper end position thereof the slat will be snapped past the two resilient noses 32, 33 which form supporting means for collecting the slats into a bundle including the head 17a (FIG. 6).

Due to the fact that the arm 63 because of its lateral movements during its raising movement alternately displaces the ladder 16 in opposite directions, the ladder will be zig-zag folded resulting in that the cross-cords will be alternately located on opposite sides of the aligned lifting cord openings in the slates. When the lifting cords are threaded through the lifting cord openings in the complete bundle of assembled slats, the lifting cords will accordingly be automatically weaved relative to the cross-cords.

What I claim is:

1. An apparatus for assembling Venetian blind slats in cord ladders with the lifting cord openings in the slats located adjacent the cross-cords supporting the slats and interconnecting the two side cords of the ladder, to form a plurality of slat receiving openings, comprising a frame, means for supporting a Venetian blind head member in a horizontal position and guiding the same for vertical movement, means for receiving and guiding a slat in a horizontal starting position when said slat is advanced in a horizontal path into two registering slat receiving openings of two ladders depending from said head member, means for raising said slat from its starting position to an upper position wherein said head supporting means engage said slat to support superposed slats and said head member, said raising means at each ladder being provided to displace the ladder alternately to either side of the aligned lifting cord openings of the assembled slats so as to enable a weaving of the lifting cord relative to said cross-cords when inserting the lifting cord through said lifting cord openings of the complete stack of assembled slats.

2. An apparatus as defined in claim 1, in which said raising means consists of a single arm pivotally mounted at one end and bifurcated at its opposite end to form two prongs for receiving said ladder therebetween, means for guiding said arm upon the raising movement to move its bifurcated end laterally alternately to opposite sides of a central position.

3. An apparatus as defined in claim 2, in which said arm is operable to be raised by a rotary cam device provided with two cams located on opposite sides of the axis of rotation, said cams being constructed to move said arm alternately to either side of said central position while raising the arm by means of one or the other cam.

4. An apparatus as defined in claim 2, in which said arm is guided in a V-shaped groove in a vertical member supported by said frame.

5. An apparatus as defined in claim 1, in which said raising means each includes two raising arms pivotally mounted and having free end portions laterally spaced to receive said ladder therebetween, a rotatable cam member provided for raising either of said two arms alternately, and guide means for effecting an inclined raising movement of each arm against said ladder to displace the same laterally.

6. An apparatus as defined in claim 5, in which said guide means comprises a vertical plate having two inclined slots for receiving said arms, each slot forming an inclined guide for the respective raising arms.

7. An apparatus as defined in claim 1, in which said raising means comprises raising arms secured to individual rings, each of said rings being rotatably mounted on an excentric and provided with a balancing arm which is pivotally and displaceably mounted at a point located on the opposite side of the excentric relative to the raising arm, the free ends of the raising arms being in the form of fingers directed obliquely toward each other, the tip of each finger being adapted to be moved into contact with the cord ladder and to move the same laterally while the finger is raising the slat.

8. An apparatus as defined in claim 1, in which said raising means consists of a plurality of successive spokes on a rotary hub, the end portions of these spokes being in the form of successive segments of a circle disposed on a common cylindrical surface but alternately directed obliquely to opposite sides, the spoked wheel being arranged such that the slat in its starting position is located between said pair of proximate spokes so that the slat upon rotation of the wheel opposite to the directions of the ends of the spokes will be raised and the raised slat will all the time be supported by the raising spoke until the next succeeding slat has been raised into contact with the preceding slat by means of the next succeeding spoke which then acts to support the superposed slats in a position at a certain height above the starting position of the inserted slat.

9. An apparatus for assembling Venetian blind slats in two cord ladders depending from a head member, a magazine for a stack of slats having two spaced openings for receiving lifting cords, a feeder mechanism for moving said slats one by one in a horizontal path onto and along horizontal guiding and supporting means to a predetermined starting position, means for supporting said head member in a vertically displaceable position above said slat starting position, said supporting means including snap action holders adapted to receive and engage said slat when raised from its starting position to a preselected upper position to form a bundle of superposed slats, means for resiliently stretching the ladders in positions located adjacent the vertical planes in which the lifting cord openings of the slat in its starting position are located, means for raising said slat from said starting to said upper position, said raising means comprising at each ladder position a pivotally mounted raising arm actuated by a rotatable cam having cam portions to be raised and lowered in synchronism with said feeder mechanism, said raising arm being guided in a V-shaped guide to move its slat supporting free end portion obliquely upwardly alternately to either side of the respective vertical plane in which the lifting cord opening is located, said cam portions being provided to urge said raising arm alternately along the legs of said V-shaped guide, and said free end portion of said raising arm being bifurcated to form two laterally spaced prongs for receiving the adjacent ladder therebetween.

No references cited.

RICHARD H. EANES, JR., *Primary Examiner.*